(12) United States Patent
Paden et al.

(10) Patent No.: US 7,715,536 B2
(45) Date of Patent: May 11, 2010

(54) METHOD AND APPARATUS FOR RECONSTRUCTING CALL PATHS IN MULTIPLE TELEPHONY SESSIONS

(75) Inventors: Jonathan Paden, Austin, TX (US); Scott Newman, Little Elm, TX (US); Doug Bruun, San Ramon, CA (US); Jon Harris, Little Elm, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1303 days.

(21) Appl. No.: 11/204,456

(22) Filed: Aug. 16, 2005

(65) Prior Publication Data

US 2007/0041538 A1 Feb. 22, 2007

(51) Int. Cl.
*H04M 15/00* (2006.01)
*H04M 1/24* (2006.01)

(52) U.S. Cl. .................. 379/112.06; 379/32.01; 379/126; 379/133

(58) Field of Classification Search ... 379/32.01–32.05, 379/112.01, 112.06, 114.04, 121.05, 126, 379/127.01, 133–139, 266.1
See application file for complete search history.

(56) References Cited

U.S. PATENT DOCUMENTS

| | | |
|---|---|---|
| 6,731,730 B1 * | 5/2004 | Zolotov ................. 379/126 |
| 6,781,959 B1 * | 8/2004 | Garakani et al. .......... 370/242 |
| 2006/0085538 A1 * | 4/2006 | Newman et al. .......... 709/224 |
| 2006/0147020 A1 * | 7/2006 | Castillo et al. ........ 379/220.01 |

* cited by examiner

*Primary Examiner*—Quoc D Tran
(74) *Attorney, Agent, or Firm*—Ed Guntin; Peter A. Chiabotti; Akerman Senterfitt

(57) ABSTRACT

A network management system (100) has a communications interface (110), a memory (104), and a controller (102). The controller is programmed to retrieve (202) a plurality of call detail records (CDRs), reconstruct (208) call paths from attributes in the plurality of CDRs, and generate (210) extended CDRs from reconstructed call paths.

15 Claims, 5 Drawing Sheets

FIG. 1 *Prior Art*

| Call Center 1 | Disc. Time | Orig. Time | Caller ID | Dur | DialedNum | CalledNum |
|---|---|---|---|---|---|---|
| CDR 1 | 12/23/2002 17:01 | 12/23/2002 16:55 | 6152236804 | 1 | 8882149587 | 8882149587 |

| Call Center 2 | Disc. Time | Orig. Time | Caller ID | Dur | DialedNum | CalledNum |
|---|---|---|---|---|---|---|
| CDR 2 | 12/23/2002 17:03 | 12/23/2002 16:56 | 6152236805 | 7 | 8881112222 | 8881112222 |

| Call Center 3 | Disc. Time | Orig. Time | Caller ID | Dur | DialedNum | CalledNum |
|---|---|---|---|---|---|---|
| CDR 3 | 12/23/2002 17:10 | 12/23/2002 17:03 | 6152236805 | 7 | | |

METHOD AND APPARATUS FOR RECONSTRUCTING CALL PATHS IN MULTIPLE TELEPHONY SESSIONS

FIELD OF THE INVENTION

The present disclosure relates generally to reconstructing call paths in a communication system, and more specifically to a method and apparatus for reconstructing call paths in multiple telephony sessions.

BACKGROUND

Service provider companies typically utilize IVRs (Interactive Voice Response Systems) for managing product sales, technical support, billing and other services. The call flows of an IVR will generally dictate interactions with a caller, and a determination is made whether the caller needs to be transferred to representatives at other call centers to address their needs. Once an IVR releases a call to the telephony network, it loses visibility to what happens during the remainder of the call.

FIG. 1 illustrates this issue. In FIG. 1, a caller dials into an IVR at reference point A. If the IVR releases a call to a specific toll free number (TFN) based on caller selection, the TFN may be pre-configured to route to a multitude of destinations based on percentage, time of day, agent availability, or other factors designated by an enterprise. Once the transfer takes place, the calling information (shown as a CDR—Call Detail Record) captured by the IVR no longer provides visibility to the complete call path the caller experiences. That is, the IVR keeps no record as to which service center was chosen, nor does it maintain a record as to whether the caller was transferred yet again between service agents.

Knowing the call path for each caller provides valuable operational metrics for the service provider. For example, a service provider can monitor excessive transfers by one or more service centers indicating perhaps an abuse and/or lack of productivity. The service provider can also assess cost of multi-trunk (e.g., 3-way calls) versus single-trunk (i.e., point-to-point call transfer) usage between service agents. The service provider can also identify highly productive centers. From this information, a service provider can continually take mitigation steps to improve service for its customers and cost effectiveness. From prior art systems such as shown in FIG. 1 it would be desirable to establish a means for reconstructing call paths in multiple telephony sessions.

DETAILED DESCRIPTION OF THE DRAWINGS

Figure 2:
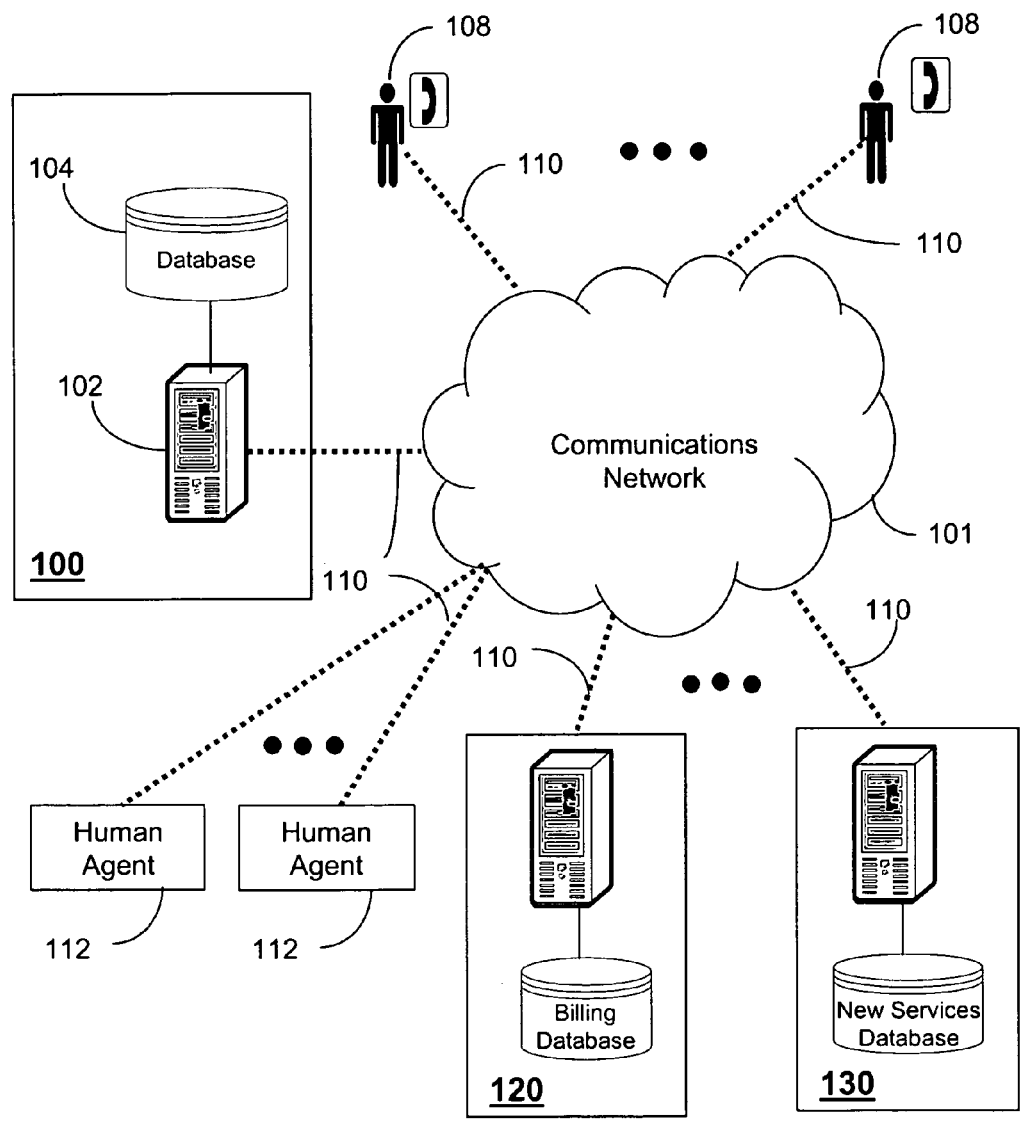
FIG. 2 is a block diagram of a network management system coupled to a communications network serving customers according to teachings of the present disclosure.

FIG. 2 is block diagram of an network management system (NMS) 100 coupled to a communications network 101 serving customers (or callers) 108 according to teachings of the present disclosure. The NMS 100 comprises a communications interface 110, a memory 104 and a controller 102. The communications interface 110 utilizes conventional wired or wireless communications technology for interfacing to the communications network 101. The communications interface 110 can represent a circuit switched and/or a packet switched interface. Internet or traditional voice services can be provided by network 101 to customers 108. Thus, the communications network 101 can support multiple services such as: POTS (Plain Old Telephone Service), VoIP (Voice over Internet communications, IPTV (Internet Protocol Television), broadband communications, cellular telephony, and other known or future communication services.

The controller 102 utilizes conventional computing technology such as a desktop computer, or a scalable server. The memory 104 utilizes conventional mass storage media such as a high capacity disk drive, and can be used by the controller 102 to manage a database in accordance with the present disclosure. The NMS 100 can also use conventional applications such as an IVR (Interactive Voice Response) application, and/or a CRM (Customer Relations Management) application for interacting with customers 108 and managing account information, respectively.

By way of the communications interface 110, the NMS 100 can access independently operated remote systems such as a billing system 120 and/or a new services system 130 operating as IVRs, respectively. The communications network 101 is composed of a variety of network elements (NEs). NEs are devices that reside inside a managed network such as in reference 101. Typically, an NE provides services such as conventional T1 lines (supporting voice and/or data), ATM (Asynchronous Transfer Mode) or Frame Relay virtual circuits, MPLS (Multi-Protocol Label Switching), and IP (Internet Protocol). Call Detail Records (CDRs) are created by NEs when a call setup (e.g., a Q.931 ISDN SETUP) message is received.

Figure 1:
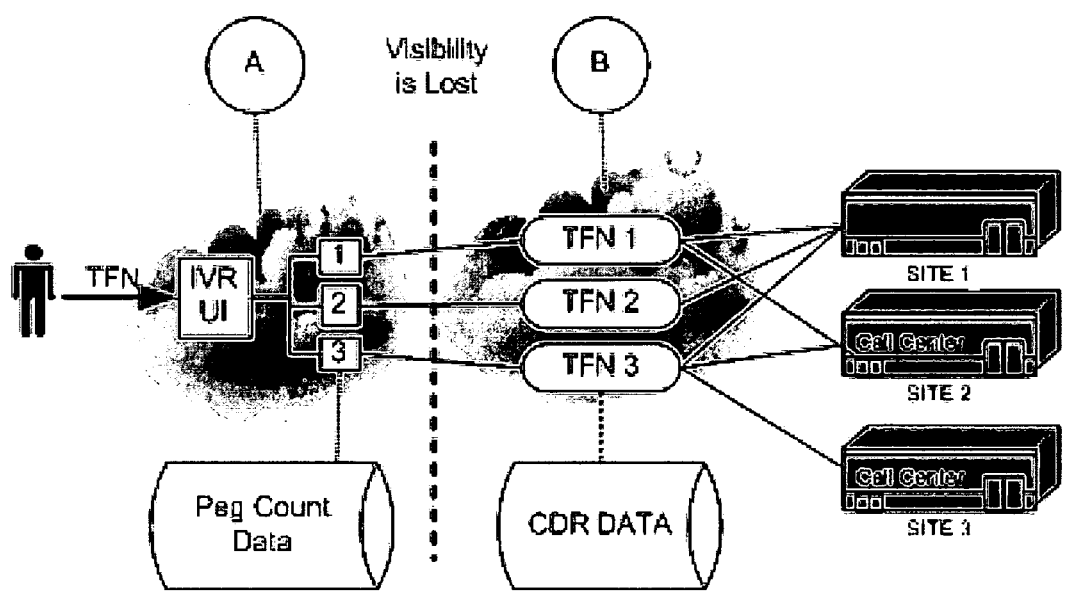
FIG. 1 is a block diagram of a prior art IVR operating in a communications network serving customer needs.

CDRs reflect NE resource consumption such as calling and called parties, bandwidth used, and processing time, among other attributes. CDR data fields are fully populated when the underlying call/transaction ends. As noted earlier with respect to FIG. 1, when a caller dials into an UVR, visibility from the IVR's perspective to the call path of subsequent transfers is lost. The lost call information is maintained in CDRs generated by NEs used in transferring calls between service centers (in the form of IVRs or human agents 112). These NEs with CDR data can be configured to emit their records for capture and processing by the billing system 120 and/or the NMS 100.

Figure 3:
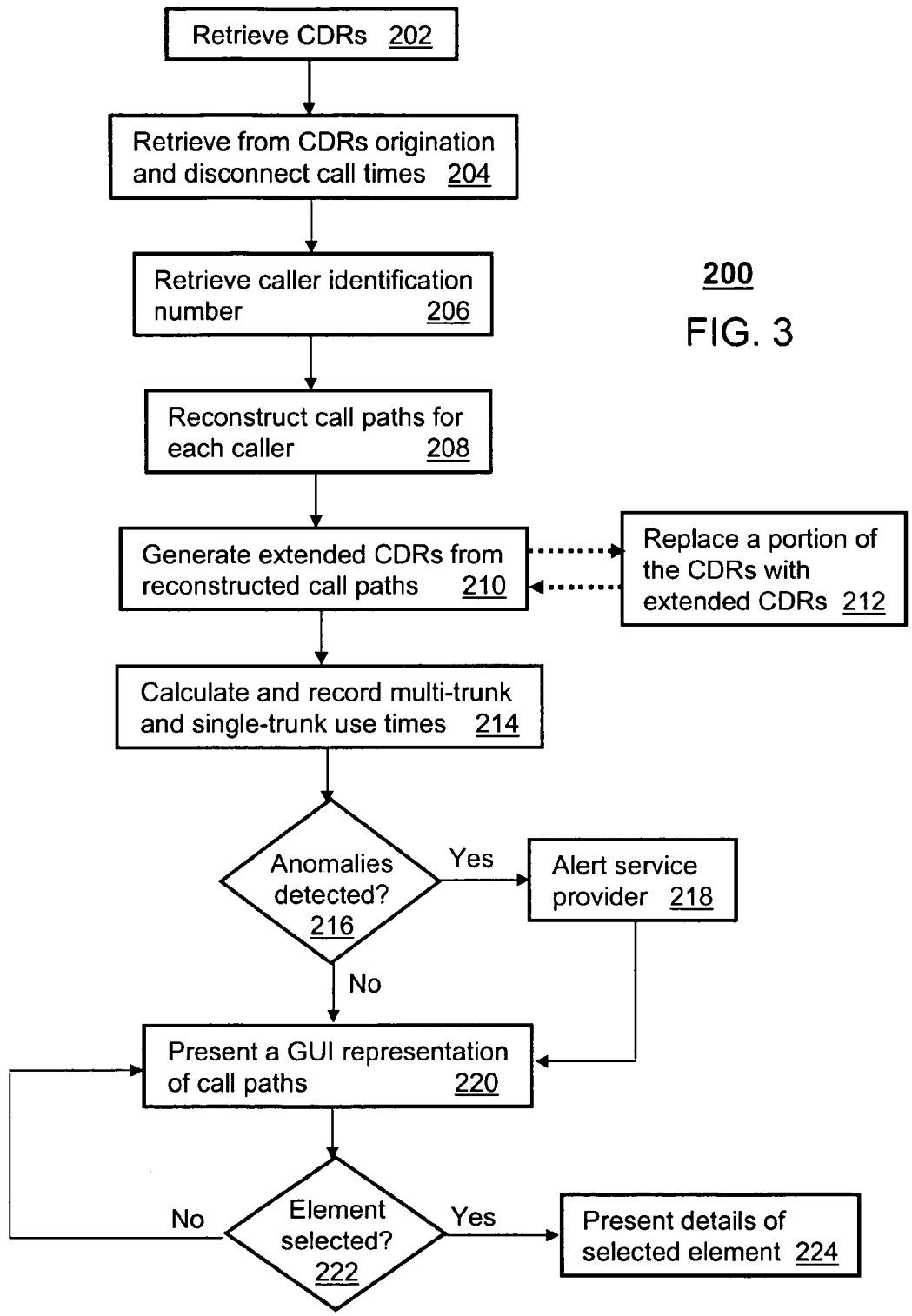
FIG. 3 depicts a flowchart of a method operating in the network management system according to teachings of the present disclosure.

FIG. 3 depicts a flowchart of a method 200 operating in the NMS 100 according to teachings of the present disclosure. In step 202, the NMS 100 retrieves CDRs from the NEs throughout the communications network 101 and other communication elements coupled thereto. From the CDRs, the NMS 100 is programmed in steps 204 and 206 to retrieve origination call times, disconnect call times, and caller identification numbers. With this information the NMS 100 can reconstruct call paths for individual callers in step 208, thereby generating in step 210 extended CDRs. The reconstruction process is illustrated by way of example in the tables of FIG. 4.

These tables represent three CDRs 1-3 each occurring at Call Centers 1-3. A Call Center in the present context can mean an IVR (such as 120 or 130) or a human agent 112 addressing the needs of a caller 108. In the present example, a caller is assumed to transact first with Call Center 1. The caller is then transferred in sequence to Call Centers 2 and 3. CDRs 1-3 are associated as a result of having the same caller identification number shown in the third column, thereby identifying a particular caller. The origination time (second column) marks the date and time by which the caller originated a call with a Call Center. In CDR 1, Call Center 1 received a call from the caller on Dec. 23, 2002, at 16:55. The call had a one-minute duration. An agent 112, for example, determining that a call transfer was warranted, transfers the caller to Call Center 2 at a TFN (Toll Free Number) of 888-214-9587. A connection is made to Call Center 2 at 16:56 (see reference arrow 1). Call Center 1, however, does not disconnect the call until 17:05 (see reference arrow 2).

This is because the agent of Call Center 1 likely spent some time to brief the agent of Call Center 2 on the caller's needs before the first agent disconnected from the call. Thus, in this example, there is a multi-trunk usage of 5 minutes (difference between 17:01 and 16:56). The agent of Call Center 2 spent an additional 2 minutes (a session totaling 7 minutes) with the caller and again determines a transfer is warranted to Call Center 3 (see reference arrow 3). The transfer is to a different TFN at 888-111-2222. However, in this transfer the originating time of CDR 3 and the disconnect time of CDR 2 are the same (see reference arrow 4). This represents a single-trunk transfer of the caller to the third Call Center. The caller then completes the transaction at Call Center 3 in 7 minutes with no further transfers.

Figures 4, 5:
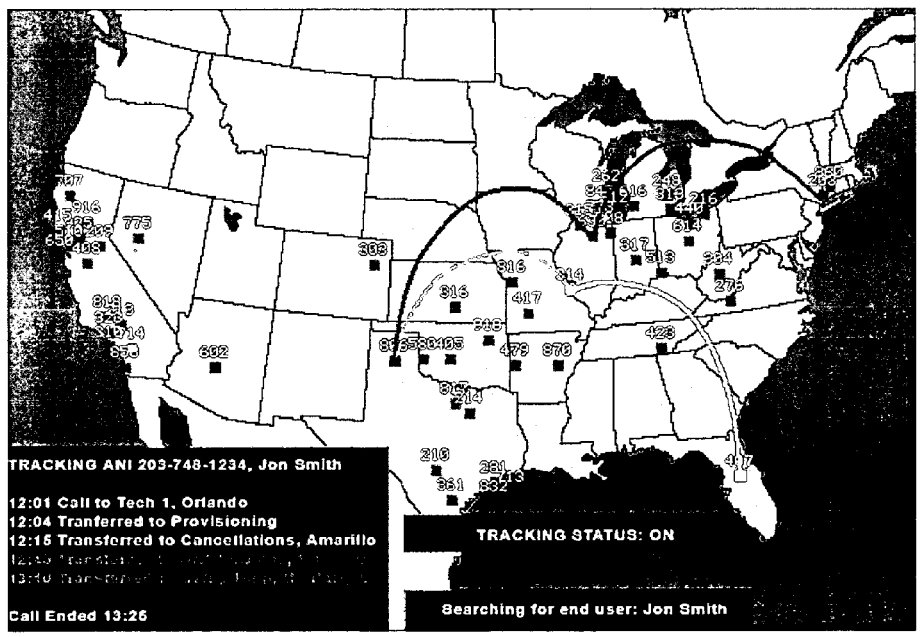
FIG. 4 is a table of CDRs (1-3) depicting how to reconstruct a call path according to teachings of the present disclosure.
FIG. 5 is a diagram depicting in a GUI (Graphical User Interface) a representation of an extended CDR according to teachings of the present disclosure.

From an example such as in FIG. 4, an extended CDR can be generated. An extended CDR can thus represent a concatenation of CDRs 1-3, or a reformatted CDR that depicts the sequence of calls just described. To save memory usage throughout the NEs and the NMS 100, the extended CDRs can replace in step 212 a portion of the original CDRs. For obvious reasons, CDRs of single legged calls would remain unchanged.

The extended CDRs generated in step 210 provide the service operator very useful operational information. For instance, in step 214, the NMS 100 can be programmed to calculate and record multi-trunk and single-trunk use times for each extended CDR. From this information, the service provider can monitor anomalous patterns in the extended CDRs in step 216. Anomalous patterns can be extracted from a frequency of call transfers, a frequency of multi-trunk usage, a frequency of single-trunk usage, or a frequency of agent-to-agent communications at select call centers. The service provider can, for instance, monitor excessively low or high usage for any one of these metrics. The service provider can also establish expected productivity and quality of service metrics that can be used to trigger thresholds for detecting anomalous patterns. It would be apparent therefore to an artisan with skill in the art that any number of metrics can be retrieved from extended CDRs, and such metrics can be utilized for monitoring operations of the communications network 101.

As anomalous events are detected in step 216, one or more agents of the service provider of the communications network 101 can be alerted in step 218 by conventional communications means such as email, over-the-air SMS, a GUI interface or like communication means. The NMS 100 can be further programmed to present in step 220 the results of the extended CDRs in a GUI interface for a particular caller such as Jon Smith shown in FIG. 5. In this illustration, Jon Smith was transferred four times starting in Orlando, Fla. at 12:01 with a call path terminating in Danbury, Conn. at 13:10. In steps 222 and 224 the NMS 100 can present the agent of the service provider selectable elements of the GUI (selected by, for example, a mouse) for reviewing network information relating to the extended CDR corresponding to Jon Smith. Such information can include multi-trunk use times, specific information relating to the call center, and so on.

It should be evident that there are numerous other embodiments for method 200. For instance, method 200 can be applied in real-time or as a batch process for periodic review by a service provider. Moreover, steps 202 through 224 can be augmented or reduced without departing from the scope and spirit of the present disclosure. Thus, although the description is made for particular arrangements and methods, the intent and concept of the present disclosure is suitable and applicable to other arrangements and applications not described herein.

Figure 6:
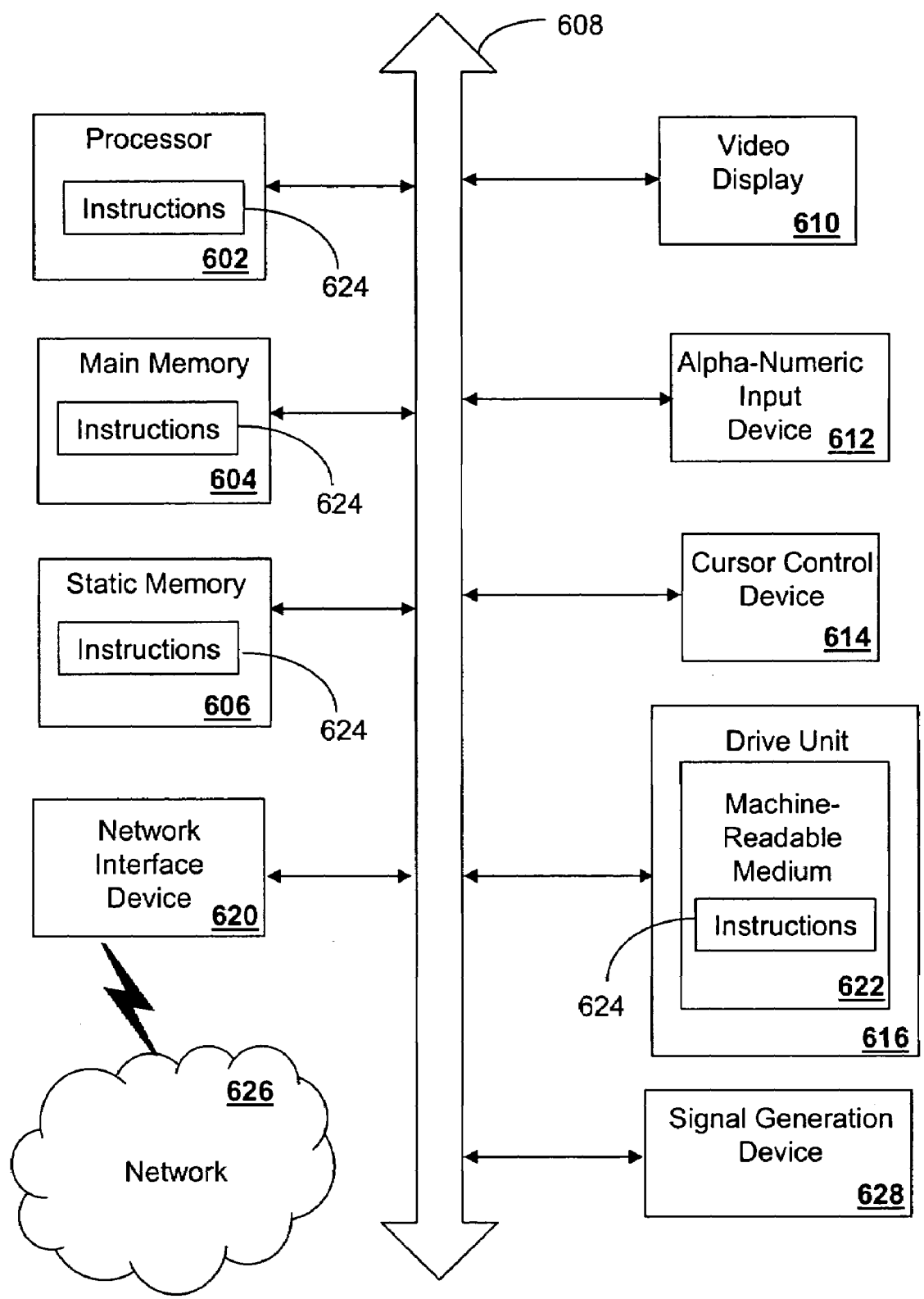
FIG. 6 is a diagrammatic representation of a machine in the form of a computer system within which a set of instructions, when executed, may cause the machine to perform any one or more of the methodologies discussed herein.

FIG. 6 is a diagrammatic representation of a machine in the form of a computer system 600 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU, or both), a main memory 604 and a static memory 606, which communicate with each other via a bus 608. The computer system 600 may further include a video display unit 610 (e.g., a liquid crystal display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control) and a network interface device 620.

The disk drive unit 616 may include a machine-readable medium 622 on which is stored one or more sets of instructions (e.g., software 624) embodying any one or more of the methodologies or functions described herein, including those methods illustrated in herein above. The instructions 624 may also reside, completely or at least partially, within the main memory 604, the static memory 606, and/or within the processor 602 during execution thereof by the computer system 600. The main memory 604 and the processor 602 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 624, or that which receives and executes instructions 624 from a propagated signal so that a device connected to a network environment 626 can send or receive voice, video or data, and to communicate over the network 626 using the instructions 624. The instructions 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: computer-readable storage medium; solid-state memories such as a memory card or other package that houses one or more read-only (non-volatile) memories, random access memories, or other re-writable (volatile) memories; magneto-optical or optical medium such as a disk or tape. Accordingly, the disclosure is considered to include any one or more of a machine-readable medium or a distribution medium, as listed herein and including art recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A network management system coupled to a communications network, comprising:
   a communications interface;
   a memory; and
   a controller programmed to:
   retrieve a plurality of call detail records (CDRs);
   reconstruct call paths from attributes in the plurality of CDRs;
   generate extended CDRs from reconstructed call paths;
   retrieve caller identification numbers from the CDRs;
   reconstruct call paths according to the caller identification numbers;
   retrieve origination and disconnect call times from the CDRs;
   calculate single-trunk transfers according nearly matched times between origination and disconnect times of corresponding CDRs; and
   record the single-trunk transfers in corresponding extended CDRs.

2. The network management system of claim 1, wherein the controller is programmed to replace a portion of the CDRs with the extended CDRs.

3. The network management system of claim 1, wherein the controller is programmed to:
   retrieve origination and disconnect call times from the CDRs;
   calculate multi-trunk use times according overlap times between origination and disconnect times of corresponding CDRs; and
   record the multi-trunk use times in corresponding extended CDRs.

4. The network management system of claim 1, wherein the controller is programmed to:
   monitor patterns in the extended CDRs; and
   alert a service provider when an anomalous pattern is detected.

5. The network management system of claim 4, wherein the anomalous pattern comprises at least one among a frequency of call transfers, a frequency of multi-trunk usage, a frequency of single-trunk usage, and a frequency of agent-to-agent communications at select call centers.

6. The network management system of claim 1, wherein the controller is programmed to present a GUI (Graphical User Interface) representation of one or more call paths corresponding to one or more extended CDRs.

7. The network management system of claim 6, wherein the controller is programmed to present selectable elements of the GUI for viewing information relating to the extended CDRs.

8. A computer readable storage medium, the storage medium being embedded with computer instructions for causing a computing device to perform the steps of:
   retrieving a plurality of call detail records (CDRs);
   reconstructing call paths from attributes in the plurality of CDRs;
   generating reformatted CDRs from reconstructed call paths;
   retrieving caller identification numbers from the CDRs;
   reconstructing call paths according to the caller identification numbers;
   retrieving origination and disconnect call times from the CDRs;
   calculating multi-trunk use times according overlap times between origination and disconnect times of corresponding CDRs; and
   recording the multi-trunk use times in corresponding extended CDRs.

9. The storage medium of claim 8, comprising computer instructions for replacing a portion of the CDRs with the extended CDRs.

10. The storage medium of claim 8, comprising computer instructions for:
    retrieving origination and disconnect call times from the CDRs;
    calculating single-trunk transfers according nearly matched times between origination and disconnect times of corresponding CDRs; and
    recording the single-trunk transfers in corresponding extended CDRs.

11. The storage medium of claim 8, comprising computer instructions for:
    monitoring patterns in the extended CDRs; and
    alerting a service provider when an anomalous pattern is detected.

12. The storage medium of claim 11, wherein the anomalous pattern comprises at least one among a frequency of call transfers, a frequency of multi-trunk usage, a frequency of single-trunk usage, and a frequency of agent-to-agent communications at select call centers.

13. The storage medium of claim 8, comprising computer instructions for presenting a GUI (Graphical User Interface) representation of one or more call paths corresponding to one or more extended CDRs.

14. The storage medium of claim 13, comprising computer instructions for presenting selectable elements of the GUI for viewing information relating to the extended CDRs.

15. A method, comprising the steps of:
    retrieving a plurality of call detail records (CDRs);
    retrieving caller identification numbers from the CDRs;
    reconstructing call paths according to the caller identification numbers;
    generating extended CDRs from the reconstructed call paths;
    retrieving origination and disconnect call times from the CDRs;
    calculating multi-trunk use times according overlap times between origination and disconnect times of corresponding CDRs;
    calculating single-trunk transfers according nearly matched times between origination and disconnect times of corresponding CDRs;
    recording the multi-trunk and single-trunk use times in corresponding extended monitoring patterns in the extended CDRs; and
    alerting a service provider when an anomalous pattern is detected.

* * * * *